United States Patent [19]

Reddy

[11] Patent Number: 4,938,890
[45] Date of Patent: Jul. 3, 1990

[54] METHOD OF MAKING YTAO$_4$:NB PHOSPHOR WITH IMPROVED BRIGHTNESS USING LITHIUM CHLORIDE-LITHIUM SULFATE EUTECTIC FLUX

[75] Inventor: Vaddi B. Reddy, Sayre, Pa.

[73] Assignee: GTE Products Corporation, Stamford, Conn.

[21] Appl. No.: 481,550

[22] Filed: Feb. 20, 1990

[51] Int. Cl.$^5$ .............................................. C09K 11/78
[52] U.S. Cl. .............................................. 252/301.4 R
[58] Field of Search ................................... 252/301.4 R

[56] References Cited

U.S. PATENT DOCUMENTS 3,758,486 9/1973 Ropp .............................. 252/301.4 R
4,225,653 9/1980 Brixner ......................... 252/301.4 R

FOREIGN PATENT DOCUMENTS 57-168982 10/1982 Japan ............................. 252/301.4 R

*Primary Examiner*—Jack Cooper
*Attorney, Agent, or Firm*—James Theodosopoulos

[57] ABSTRACT

A method of making a niobium activated yttrium tantalate x-ray phosphor using a lithium chloride-lithium sulfate eutectic flux is disclosed. The mole ratio of the flux is 46.5 mole percent lithium chloride to 53.5 mole percent lithium sulfate. Use of this flux improves phosphor brightness by up to 18%, reducing the x-ray dosage to the patient.

5 Claims, No Drawings

METHOD OF MAKING YTAO₄:NB PHOSPHOR WITH IMPROVED BRIGHTNESS USING LITHIUM CHLORIDE-LITHIUM SULFATE EUTECTIC FLUX

TECHNICAL FIELD

This invention relates to the manufacture of niobium activated yttrium tantalate x-ray phosphor.

BACKGROUND ART

Such phosphors are disclosed in U.S. Pat. Nos. 4,225,653 and 4,387,141. The phosphor composition in both patents has the formula $YNb_xTa_{1-x}O_4$, where x is 0 to about 0.15. A mixture of raw materials is fired and then blended with a flux, which can be lithium sulfate, lithium chloride, or a barium chloride-lithium chloride eutectic mix, before refiring. The weight of the flux ranges from about 20 to about 50 weight percent of the mixture.

OBJECT OF THE INVENTION

It is an object of the invention to provide a niobium activated yttrium tantalate x-ray phosphor with improved brightness.

SUMMARY OF THE INVENTION

The invention is accomplished by a method of making niobium-activated yttrium tantalate x-ray phosphor, comprising the steps of forming a uniform mixture consisting essentially of stoichiometric amounts of yttrium oxide, tantalum oxide, and niobium oxide; blending the mixture with a flux consisting essentially of a lithium chloride-lithium sulfate eutectic mixture; firing the resulting mixture at a temperature of about 1200°–1300° C. (2192°–2372° F.) for about 10 to 14 hours to form the phosphor; washing the phosphor in deionized water to remove the flux; and filtering, drying and classifying the phosphor.

It has been discovered that phosphor brightness can be improved by the use of a lithium chloride-lithium sulfate eutectic mixture. The resulting phosphor is up to 18% brighter than phosphors made with other fluxes. The improved brightness of the phosphor enables the patient to receive a lower x-ray dosage. In such a eutectic mixture, the mole ratio of lithium chloride to lithium sulfate is about 0.465:0.535.

The following non-limiting examples are presented.

EXAMPLE 1

Stoichiometric amounts of yttrium oxide, $Y_2O_3$, tantalum oxide, $Ta_2O_5$, and niobium oxide, $Nb_2O_5$, were weighed and blended together to form a phosphor composition of $YTa_{0.98}Nb_{0.02}O_4$. The molar concentration of niobium activator was 0.02 moles. A flux of lithium chloride, LiCl, in an amount equal to 33 weight percent was added to the mixture and blended using standard blending procedures. The blend was loaded into an alumina crucible and fired in a gas or electric furnace at about 1200°–1300° C. (2192°–2372° F.) for about 10–14 hours. The fired material was cooled in the furnace and the flux material leached out with hot or cold deionized water washings. The flux-free material was then filtered, dried and classified. The sample was then measured for luminescence efficiency under x-ray excitation. The brightness of this sample was normalized at 100.

EXAMPLE 2

The procedure of Example 1 was followed using a lithium sulfate flux, $Li_2SO_4$, in an amount equal to 33 weight percent of the mixture. The brightness of this sample was improved by 3% over Example 1.

EXAMPLE 3

The procedure of Example 1 was followed using a eutectic flux mixture of lithium chloride and lithium sulfate, $(LiCl)_2$-$Li_2SO_4$, in an amount equal to 33 weight percent of the mixture. The mole ratio of the eutectic flux was 46.5 mole percent lithium chloride to 53.5 mole percent lithium sulfate. The eutectic (melting) temperature of this flux material is 478° C. (892° F.). The brightness of this sample was improved by 6% over Example 1.

EXAMPLE 4

Stoichiometric amounts of yttrium oxide, tantalum oxide, and niobium oxide were weighed and blended together to form a phosphor composition of $YTa_{0.99}Nb_{0.01}O_4$. The molar concentration of niobium activator was 0.01 moles. A flux of lithium chloride, LiCl, in an amount equal to 33 weight percent was added to the mixture and blended using standard blending techniques. The phosphor was fired according to Example 1. The finished sample was then measured for luminescence efficiency under x-ray excitation. The brightness of this sample was normalized at 100.

EXAMPLE 5

The procedure of Example 4 was followed using a lithium sulfate flux, $Li_2SO_4$, in an amount equal to 33 weight percent of the mixture. The brightness of this sample was improved by 10% over Example 4.

EXAMPLE 6

The procedure of Example 4 was followed using a eutectic flux mixture of lithium chloride and lithium sulfate, $(LiCl)_2$-$Li_2SO_4$, in an amount equal to 33 weight percent of the mixture. The mole ratio of the eutectic flux was 46.5 mole percent lithium chloride to 53.5 mole percent lithium sulfate. The eutectic (melting) temperature of this flux material is 478° C. (892° F.). The brightness of this sample was improved by 12% over Example 4.

EXAMPLE 7

Stoichiometric amounts of yttrium oxide, tantalum oxide, and niobium oxide were weighed and blended together to form a phosphor composition of $YTa_{0.995}Nb_{0.005}O_4$. The molar concentration of niobium activator was 0.005 moles. A flux of lithium chloride, LiCl, in an amount equal to 33 weight percent was added to the mixture and blended using standard blending techniques. The phosphor was fired according to Example 1. The finished sample was then measured for luminescence efficiency under x-ray excitation. The brightness of this sample was normalized at 100.

EXAMPLE 8

The procedure of Example 7 was followed using a lithium sulfate flux, $Li_2SO_4$, in an amount equal to 33 weight percent of the mixture. The brightness of this sample was improved by 7% over Example 7.

EXAMPLE 9

The procedure of Example 7 was followed using a eutectic flux mixture of lithium chloride and lithium sulfate, $(LiCl)_2$-$Li_2SO_4$, in an amount equal to 33 weight percent of the mixture. The mole ratio of the eutectic flux was 46.5 mole percent lithium chloride to 53.5 mole percent lithium sulfate. The eutectic (melting) temperature of this flux material is 478° C. (892° F.). The brightness of this sample was improved by 18% over Example 7.

X-ray optical fluorescence (XOF) brightness data for the examples are given in Table 1.

TABLE 1

YTaO$_4$:Nb Brightness Data

| SAMPLE | NIOBIUM CONC. | FLUX 33 WT % | BRIGHTNESS |
|---|---|---|---|
| 1 | 0.02 MOLES | LiCl | 100% |
| 2 | 0.02 | Li$_2$SO$_4$ | 103 |
| 3 | 0.02 | (LiCl)$_2$—Li$_2$SO$_4$ | 106 |
| 4 | 0.01 | LiCl | 100 |
| 5 | 0.01 | Li$_2$SO$_4$ | 110 |
| 6 | 0.01 | (LiCl)$_2$—Li$_2$SO$_4$ | 112 |
| 7 | 0.005 | LiCl | 100 |
| 8 | 0.005 | Li$_2$SO$_4$ | 107 |
| 9 | 0.005 | (LiCl)$_2$—Li$_2$SO$_4$ | 118 |

The data indicate that the greatest improvement in brightness is obtained using a niobium activator concentration of 0.005 moles with the lithium chloride-lithium sulfate eutectic flux.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method of making niobium-activated yttrium tantalate x-ray phosphor, comprising the steps of:

forming a uniform mixture consisting essentially of stoichiometric amounts of yttrium oxide, tantalum oxide, and niobium oxide;

blending said mixture with a flux consisting essentially of a lithium chloride-lithium sulfate eutectic mixture wherein the mole ratio of lithium chloride to lithium sulfate is 0.465:0.535;

firing said mixture at a temperature of about 1200°–1300° C. for about 10 to 14 hours to form said phosphor;

washing said phosphor in deionized water to remove said flux; and filtering, drying and classifying said phosphor, said phosphor exhibiting a higher brightness than the phosphor prepared as above but where either lithium chloride or lithium sulfate is used as the flux instead of said eutectic mixture.

2. The method of claim 1 wherein the concentration of niobium activator in said phosphor is 0.005 moles per mole of phosphor.

3. The method of claim 1 wherein the concentration of niobium activator in said phosphor is 0.01 moles per mole of phosphor.

4. The method of claim 1 wherein the concentration of niobium activator in said phosphor is 0.02 moles per mole of phosphor.

5. The method of claim 1 wherein said eutectic flux comprises about 33 weight percent of said uniform mixture.

* * * * *